United States Patent
Cacharelis

(12) 
(10) Patent No.: US 6,313,901 B1
(45) Date of Patent: Nov. 6, 2001

(54) LIQUID CRYSTAL DISPLAY FABRICATION PROCESS USING A FINAL RAPID THERMAL ANNEAL

(75) Inventor: Philip John Cacharelis, Menlo Park, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/388,054

(22) Filed: Sep. 1, 1999

(51) Int. Cl.$^7$ ............................................. G02F 1/13
(52) U.S. Cl. ........................ 349/187; 438/275; 438/294
(58) Field of Search ..................... 349/187; 438/275, 438/294, 3, 656, 460; 257/745, 355, 757

(56) References Cited

U.S. PATENT DOCUMENTS

| | | | |
|---|---|---|---|
| 5,198,371 | * | 3/1993 | Li .......................................... 438/475 |
| 5,330,921 | * | 7/1994 | Yoshida et al. ....................... 438/294 |
| 5,374,578 | * | 12/1994 | Patel et al. ................................ 438/3 |
| 5,706,067 | | 1/1998 | Colgan et al. ......................... 349/114 |
| 5,764,324 | | 6/1998 | Lu et al. ................................ 349/113 |
| 5,789,318 | * | 8/1998 | Delfine et al. ......................... 438/656 |
| 6,117,737 | * | 9/2000 | Wang et al. ........................... 438/275 |
| 6,225,193 | * | 5/2000 | Simpson et al. ....................... 438/460 |

OTHER PUBLICATIONS

Wolf, S., "Silicon Processing for the VLSI ERA", vol. 3, The Submicron Mosfet, pp. 425–429.

Cacharelis, P., et al., "A Reflective–mode PDLC Light Valve Display Technology", Proceedings of European Solid State Device Research Conference (ESSDERC) pp. 596–599 (1997).

Cacharelis, P., et al., 18.1: An 0.8–$\mu$m EEPROM Technology Modified for a Reflective PDLC Light–Valve Application, SID 97 Digest, pp. 289–292.

* cited by examiner

Primary Examiner—William L. Sikes
Assistant Examiner—Julie Ngo
(74) Attorney, Agent, or Firm—Stallman & Pollock LLP

(57) ABSTRACT

A process flow for forming a pixel cell for a light valve implements the furnace alloy/sintering step prior to deposition of the reflective metal layer from which the active pixel electrodes are to be formed. In this manner, the active pixel electrodes are spared loss of reflectance associated with prolonged exposure to high temperatures of the furnace alloy/sintering step. Adequate suppression of surface state charges created after the furnace alloy/sintering is ensured by performing a rapid thermal anneal at the conclusion of the process flow.

8 Claims, 4 Drawing Sheets

LIQUID CRYSTAL DISPLAY FABRICATION PROCESS USING A FINAL RAPID THERMAL ANNEAL

BACKGROUND OF THE INVENTION

1. Field of the Invention

The present invention relates to light valves, and in particular, to a process for forming a light valve pixel cell utilizing a final rapid thermal anneal (RTA) step.

2. Description of Related Art

Liquid crystal displays (LCDs) are becoming increasingly prevalent in high-density projection display devices. These display devices typically include a light source which passes light through a light valve.

One of the methods for producing colors in a liquid crystal display is to sequentially project light having a wavelength corresponding to a primary color onto a single light valve. Color sequential light valves create a spectrum of color within the range of the human perception by switching between a set of discrete primary colors. Typically, red, green, and blue are the primary tri-stimulus colors used to create the remaining colors of the spectrum.

Specifically, during projection of each primary color, the light intensity is modulated such that combination of the intensities of the primary colors in sequence produces the desired color. The frequency of switching between the primary wavelengths by the light valve should be sufficiently rapid to render discrete primary states indistinguishable to the human eye.

Two factors dictate the minimum frequency necessary for switching. The first factor is the ability of the human eye to detect the discrete primary colors (e.g., red, green, blue). At slower than ideal switching speeds, the human eye will detect a flicker and the primaries may not blend.

The second factor determining the frequency of switching is the video refresh rate. During display of video images, the individual frames must be refreshed at frequencies undetectable to the human eye.

The net frequency of switching demanded by the combination of sequential color blending and video refreshing is beyond the capabilities of light valves that utilize thick (>1µm) liquid crystal (LC) transducers. However, thin (<1µm) liquid crystal transducers have been successfully fabricated. These thin LC transducers demonstrate adequate color sequential blending at video refresh rates. One example of such a thin LC transducer pixel cell structure is disclosed in U.S. Pat. No. 5,706,067, to Colgan et al.

In general, the conventional thin LC transducer pixel cells possess enhanced responsiveness due to the decreased volume of liquid crystal material between the top and bottom plates. A smaller volume enables the liquid crystal to shift orientation more quickly and in response to a lower applied voltage.

FIG. 1A shows a plan view of adjacent thin LC transducer pixel cells in a conventional light valve. FIG. 1B shows a cross-sectional view of the adjacent pixel cells of FIG. 1A across line 1B–1B'. Light valve portion 100 comprises adjacent pixel cells 110a and 110b having liquid crystal (LC) material 111 sandwiched within gap 106 between a top plate and a bottom plate. The top plate is composed of a translucent material, typically glass. The underside of the top plate is coated with optically transparent and electrically conducting material, typically indium-tin oxide (ITO). This conductive layer serves as a passive electrode for the active pixels below. This passive electrode layer also typically bears a polyimide layer, which is scored to provide an anchoring alignment for the LC material 111.

The bottom plate of the pixel cell is formed by the active reflective metal pixel electrodes 112a and 112b of adjacent pixels 110a and 110b, respectively. Pixel electrodes 112a and 112b are separated and electrically isolated by trench 118.

Trench 118 is filled with dielectric material 121. Dielectric material 121 also extends over the surface of the active pixel electrodes, performing a passivation, planarization, and/or LC alignment function.

Pixel electrodes 112a and 112b lie on top of an upper intermetal dielectric layer 128 that forms a component of interconnect scheme 104. Interconnect 104 overlies capacitor structures 120a and 120b formed within underlying silicon substrate 105.

Storage capacitors 120a and 120b are in electrical communication with pixel electrodes 112a and 112b, respectively, through metal-filled vias 140, middle interconnect metallization layer 124, and lower interconnect metallization layer 122. Storage capacitors 120a and 120b are controlled by MOS switching transistors 142a and 142b, respectively. MOS switching transistors 142a and 142b are also formed in underlying silicon substrate 105, and are electrically isolated from adjacent semiconducting devices by trench isolation structures 144.

The conventional pixel cell described above in FIGS. 1A–1B functions adequately in many applications. However, this design suffers from a number of disadvantages.

One problem is that favorable optical characteristics of the pixel cell can be diminished by specific processing steps utilized during its manufacture. In particular, one important measure of pixel cell performance is reflectance, which determines both brightness and resolution of the image presented. Reflectance of the pixel cell is determined by reflectance of the active pixel electrode, and the reflectance of this electrode can be adversely affected by heat during fabrication of the device.

Therefore, there is a need in the art for a process for fabricating a pixel cell which preserves reflectance of the active pixel electrode.

SUMMARY OF THE INVENTION

The present invention provides a process flow for forming a pixel cell in which the furnace alloy/sintering step is performed prior to formation of the reflective metal layer from which the active electrodes are created. In this manner, the deposited reflective metal layer is spared prolonged exposure to high temperatures that increase metal surface roughness and degrade reflectance. Adequate removal of any remaining charge is ensured at the conclusion of the process flow by the addition of a final rapid thermal anneal step.

A process flow for forming a pixel cell in accordance with one embodiment of the present invention comprises the steps of forming an oxide/silicon interface in a semiconductor workpiece, the oxide/silicon interface including surface state charges. A furnace anneal of the semiconductor workpiece is performed for at least 30 minutes at a temperature of between about 400–450° C., the furnace anneal suppressing the surface state charges. An interconnect structure is formed including an intermetal dielectric layer over the semiconductor workpiece. A plurality of discrete reflective metal pixel electrodes is formed over the intermetal dielectric layer after the furnace anneal step, and a rapid thermal anneal is performed at a temperature of between about 400–450° C. for not longer than 30 seconds after formation of the discrete reflective metal pixel electrodes, the rapid thermal anneal further suppressing the surface state charges. The features and advantages of the present invention will be understood upon consideration of the following detailed description of the invention and the accompanying drawings.

BRIEF DESCRIPTION OF THE DRAWINGS

FIGS. 3A–3I show cross-sectional views of the process steps for forming an array of pixel cells in accordance with a first embodiment of the present invention.

DETAILED DESCRIPTION

Figure 1A:
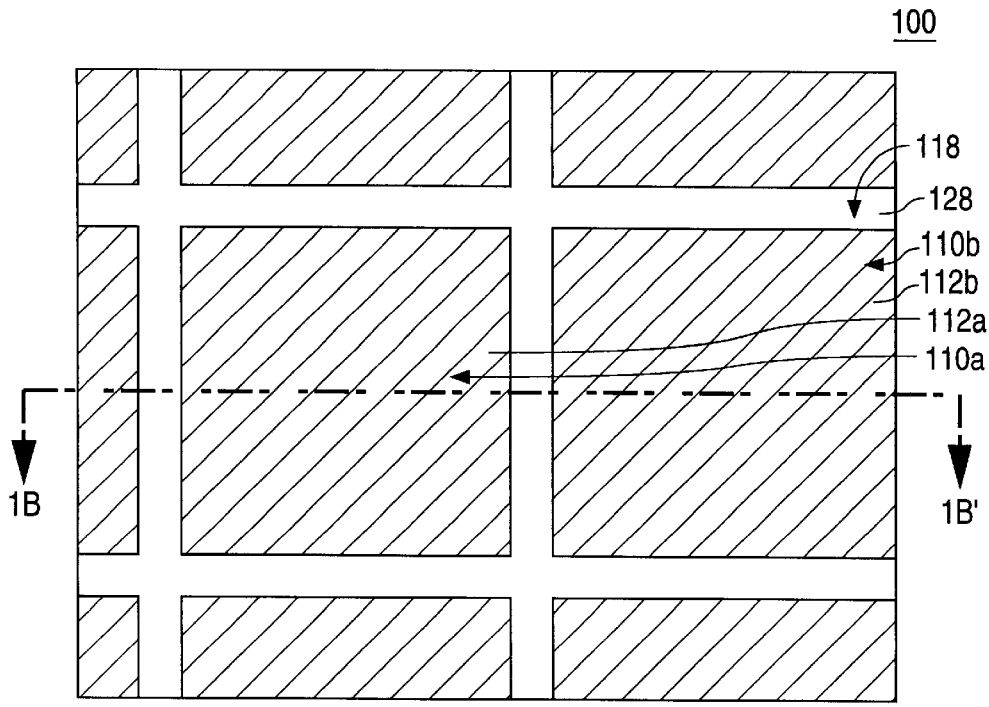
FIG. 1A shows a plan view of adjacent conventional pixel cells in a light valve.
Figure 1B:
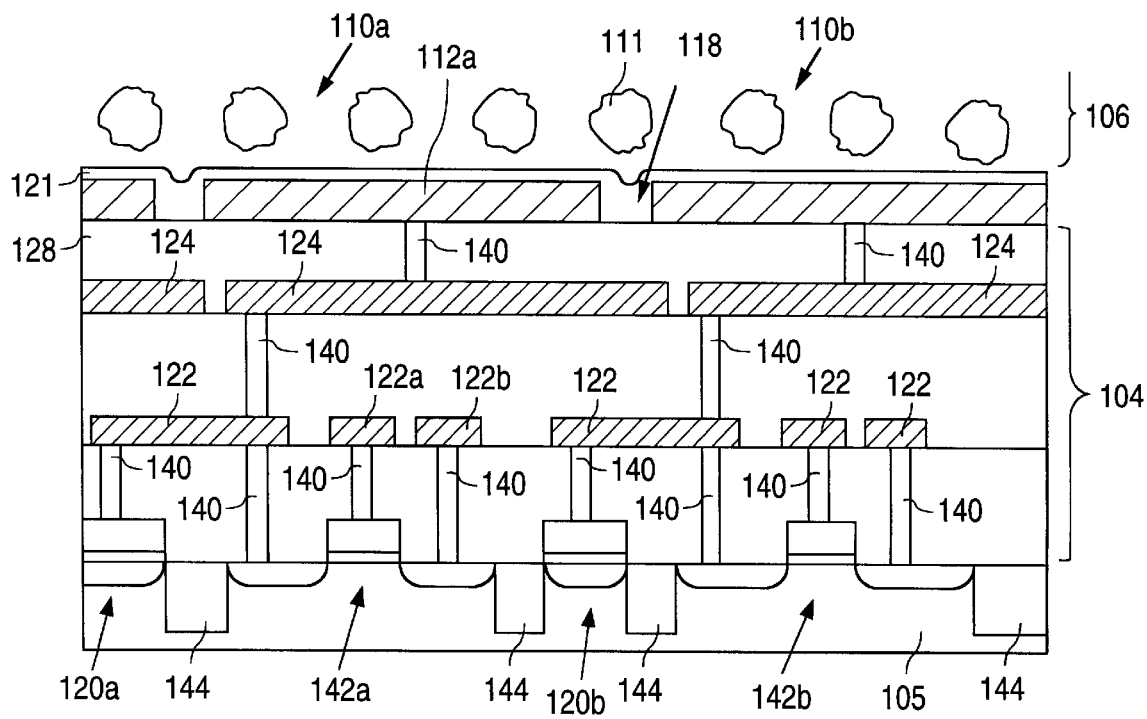
FIG. 1B shows a cross-sectional view of the adjacent pixel cells of FIG. 1A.
Figure 2:
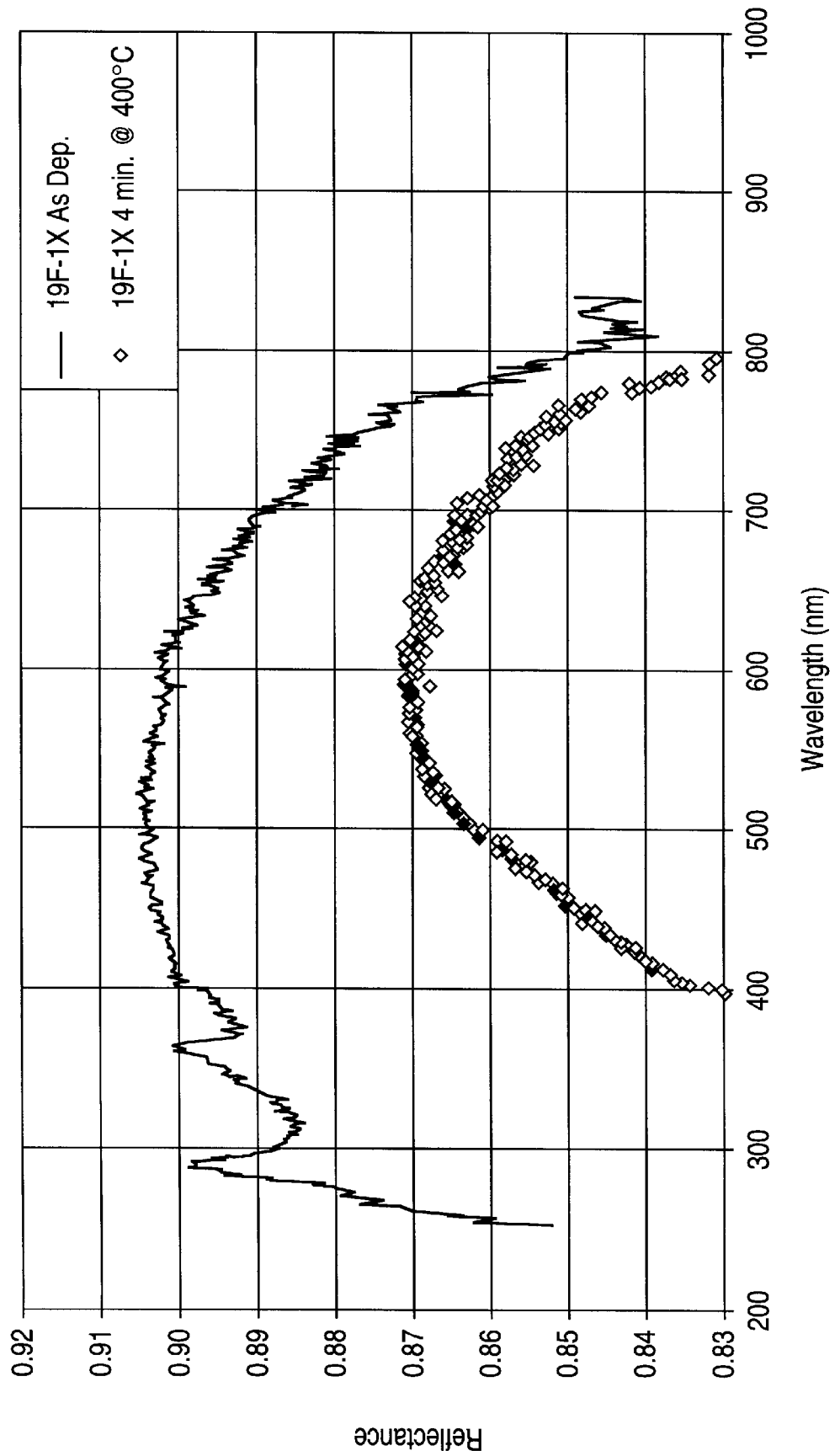
FIG. 2 plots the effect upon reflectance of exposing a deposited metal layer to heating for 4 min. at 400° C.

Prolonged exposure of a deposited metal to elevated temperatures results in a decline in reflectance of the metal surface. This is illustrated by FIG. 2, which plots reflectance over wavelength for deposited aluminum active pixel electrodes after heating at 400° C. for 4 min. FIG. 2 reveals an across-the-spectrum decline in reflectance.

The impact of annealing upon the reflectance of deposited metal layers is important because a prolonged high temperature alloy/sintering step is conventionally employed at the conclusion of the process flow for forming the pixel cell. The purpose of the furnace alloy/sintering step is to suppress surface state charges ($Q_{ss}$) generated in active device regions as a result of processing steps. These surface state charges commonly take the form of dangling bonds at the silicon/silicon dioxide interface.

Surface state charges can arise as a result of one of several processing steps employed during fabrication of the pixel cell. The bulk of surface state charge is created when oxide making up the gate oxide of the MOS switching transistors or the dielectric of the storage capacitors is formed over the silicon. However, other front-end processing steps such as ion implantation of charged dopant to form active device regions can also give rise to surface state charges. Surface state charges can also be created during back-end processing, for example during the application of plasma to etch vias in intermetal dielectric, or to strip patterned photoresist masks.

The alloy/sintering step suppressing unwanted surface state charges is typically performed at high temperatures (400–450° C.), in the presence of a forming gas (typically 5–10% $H_2$ in $N_2$), for a significant duration (30 min. or more). During the high temperature of the alloy/sintering step, hydrogen reaches the silicon/silicon dioxide interface and reacts with dangling silicon or oxide bonds, neutralizing them. If permitted to remain, the surface state charges would adversely affect the behavior of the underlying MOS switching transistors. Surface state charges introduce unwanted variation in the threshold voltages of the MOS devices by reinforcing or retarding the voltage bias applied to the MOS gate. Surface state charges also affect transconductance of the MOS devices by altering electron transport and current flow through channel regions.

Unfortunately, as shown in FIG. 2, prolonged exposure of deposited metal to high temperatures of the conventional furnace alloy/sintering step can reduce pixel reflectance and thereby degrade image brightness and resolution.

Accordingly, the present invention proposes a process for forming a pixel cell and array in which the furnace alloy/sintering step is relocated in the process flow prior to formation of the reflective metal from which the active pixel electrodes are to be created. This change in the order of fabrication steps spares the smooth, freshly-deposited metal layer from prolonged exposure to the high temperatures of the furnace anneal, and the corresponding decline in reflectance that may result.

The process flow in accordance with the present invention also incorporates an RTA step at the conclusion of processing. This added RTA step suppresses surface state charges arising after the furnace anneal, without disturbing reflectance of the active pixel electrodes.

Figure 3A:
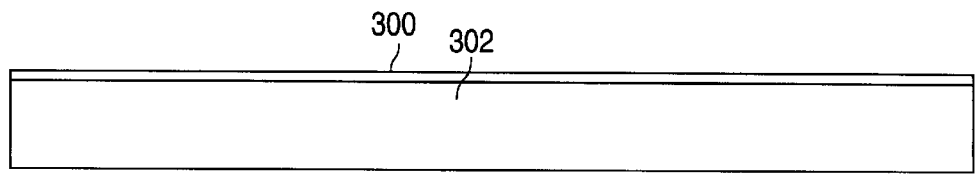

FIGS. 3A–3I show the process flow in accordance with a first embodiment of the present invention. FIG. 3A shows the starting point of the process, wherein oxide layer 300 is formed over single crystal silicon 302. It is during this step that the bulk of the surface state charges are generated.

Figure 3B:
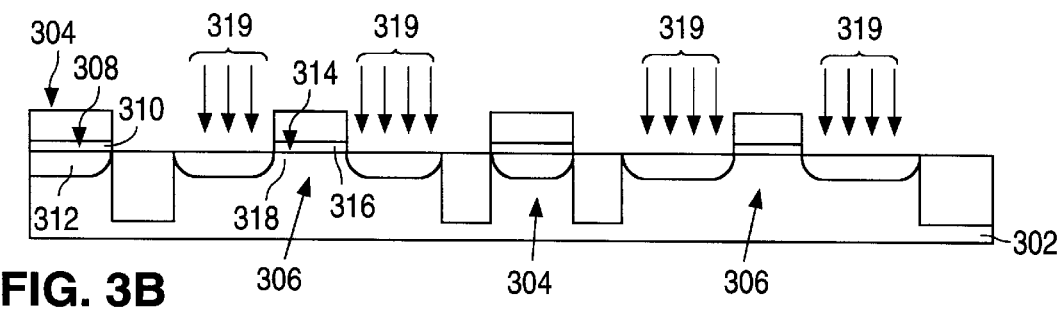

FIG. 3B shows formation of semiconductor devices 304 and 306 within single crystal silicon 302. Storage capacitor 304 includes oxide/silicon interface 308 between dielectric component 310 and doped single crystal silicon region 312 forming one capacitor plate. MOS switching transistor 306 includes oxide/silicon interface 314 between gate oxide 316 and channel 318. At the point in the process flow shown in FIG. 3B, oxide/silicon interfaces 308 and 314 possess substantial surface state charges due to oxide formation and/or implantation of charged dopant 319 into single crystal silicon 302 to form active device regions.

Figure 3C:
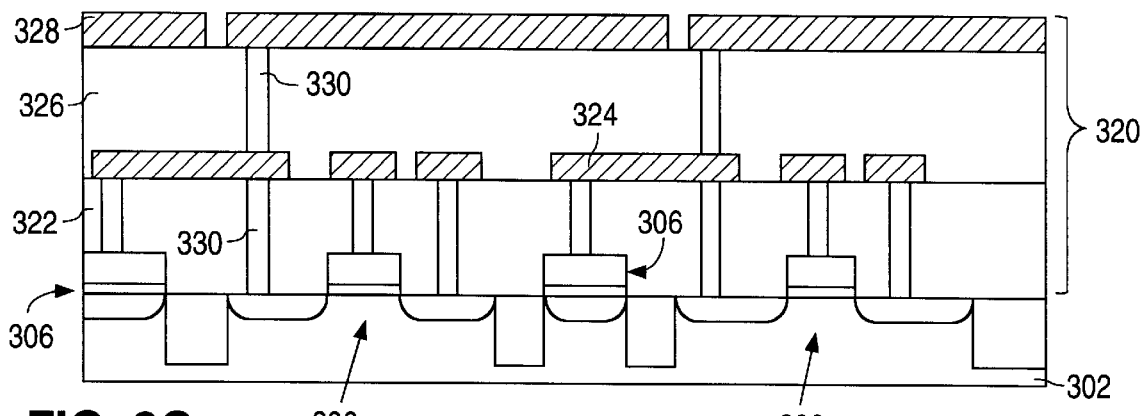

FIG. 3C shows subsequent formation of a portion of interconnect 320 over single crystal silicon 302 and semiconducting devices 304 and 306 contained therein. Interconnect 320 includes lower intermetal dielectric layer 322 formed over single crystal silicon 302, and first interconnect metallization layer 324 formed over lower intermetal dielectric layer 322. Middle intermetal dielectric layer 326 is formed over first interconnect metallization layer 324, and second interconnect metallization layer 328 is formed over middle intermetal dielectric layer 326. Electrical contact between semiconducting structures 304 and 306 and overlying interconnect metallization 324 and 328 is permitted by metal filled vias 330.

Remaining FIGS. 3D–3I focus upon interconnect 320 and do not show the underlying single crystal silicon and the semiconducting devices contained therein.

Figure 3D:
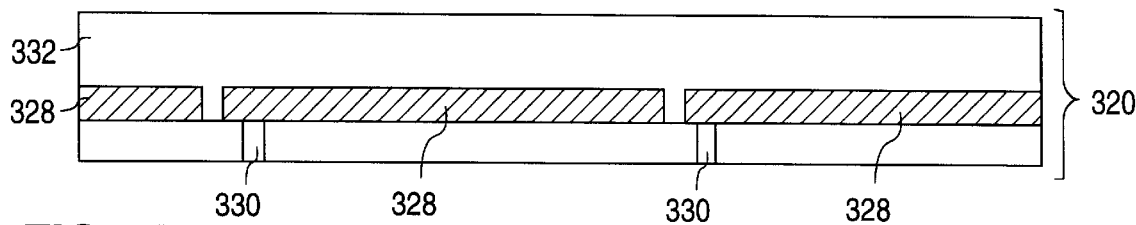
Figure 3E:
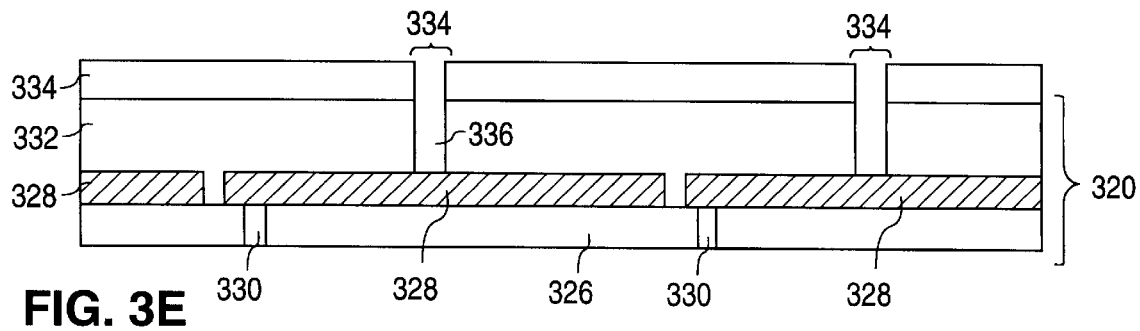

FIG. 3D shows formation of top intermetal dielectric layer 332 over second interconnect metallization layer 328. FIG. 3E shows the patterning of first photoresist mask 334 over top intermetal dielectric layer 332. Unmasked portions 334 of middle intermetal dielectric layer 332 are then etched to form vias 336. Etching during this step may take the form of plasma etching, which serves to create additional surface state charges in the structure.

Figure 3F:
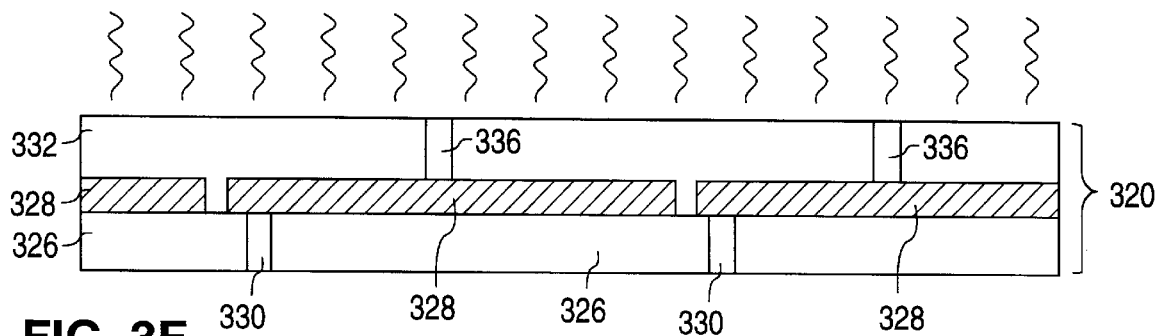
Figure 3E:
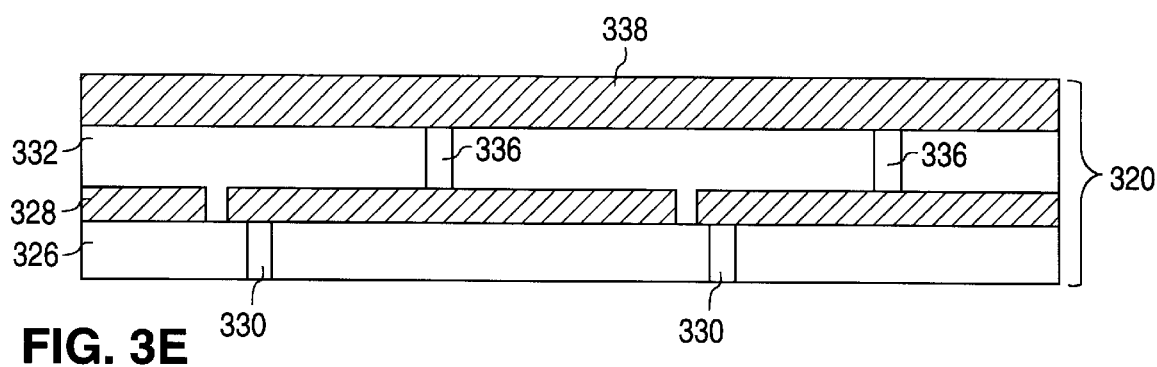

FIG. 3F shows stripping of first photoresist mask 334, followed by the filling of vias 336 with electrically conducting material. Stripping of first photoresist mask 334 may also be accomplished utilizing plasma-based techniques, further introducing surface state charges into the structure.

Following removal of electrically conducting material outside of vias 336, FIG. 3F shows the furnace alloy/sintering step in accordance with the present invention. This furnace anneal is performed at between 400–450° C. for a period of 30 min. The furnace anneal suppresses surface state charges accumulated from front- and back-end processing steps occurring prior to this point in the process.

FIG. 3G shows formation of reflective metal layer 338 over top intermetal dielectric layer 332 and filled vias 336. Reflective metal layer 338 is typically formed by chemical vapor deposition of metal resulting in a smooth surface having high reflectance.

Figure 3H:
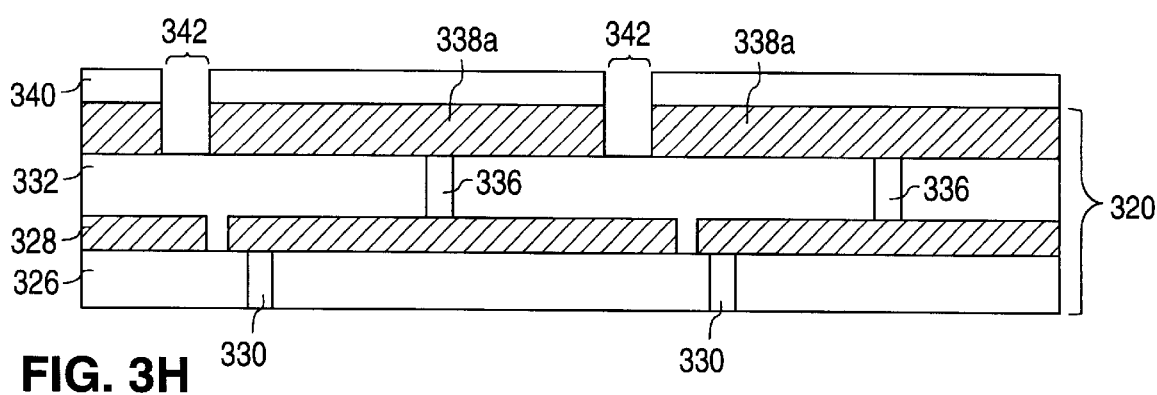

FIG. 3H shows patterning of second photoresist mask 340 over freshly-deposited reflective metal layer 338. Reflective metal layer 338 is then etched in unmasked interpixel regions 342 to stop on underlying top intermetal dielectric layer 332. This etch process generates discrete reflective active pixel electrodes 338*a*. Active pixel electrodes 338a communicate with semiconducting devices in the underlying single crystal silicon through interconnect 320.

Figure 3I:
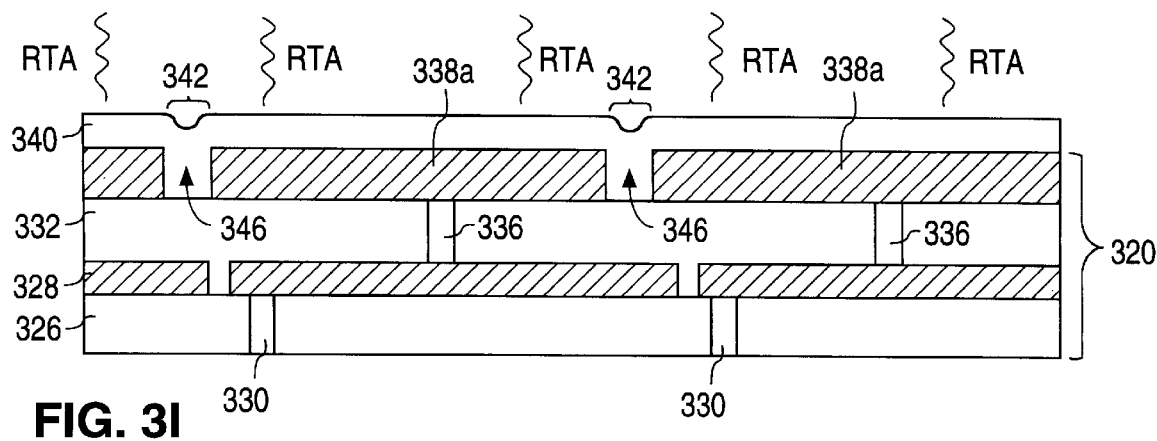

FIG. 3I shows completion of the process in accordance with the first embodiment of the present invention. Dielectric material 344 is formed over the reflective surfaces of discrete active pixel electrodes 328*a*, and also penetrates into trenches 346 in inter-pixel regions 342. Dielectric material 344 may be composed of a single layer, or of a plurality of layers.

FIG. 3I also shows the final rapid thermal anneal step, wherein the structure is heated from room temperature to between 400–450° C. Unlike the prior furnace anneal step shown in FIG. 3F however, the duration of heating during this RTA step is 30 seconds or less. The structure is then rapidly returned to ambient temperature.

The RTA step shown in FIG. 3I suppresses any surface charge states accumulated during back-end processing subsequent to the furnace anneal of FIG. 3F. For instance, these additional surface charge states may be created during plasma etching of the reflective metal layer to form the discrete electrodes, or may be created during plasma stripping of the photoresist mask employed during this etch process.

The process for forming the thin LC transducer pixel cell in accordance with the present invention offers a number of important advantages. One advantage is preservation of the high reflectance of the pixel cell. Because the reflective active pixel electrodes are spared exposure to the prolonged furnace alloy/sintering step, no decline in electrode reflectance is observed as a result of this step. As the furnace anneal step is performed prior to deposition of the reflective metal layer from which the discrete electrodes will later be formed, this metal layer is preserved in the same smooth and highly reflective state as originally deposited. The relatively brief duration of the final RTA step of the present invention does not adversely affect this reflectance.

Another advantage of the present invention is its ready incorporation into existing process flows. Repositioning the anneal/sintering step to earlier in the process flow, prior to deposition of the reflective active electrode layer, may be accomplished without additional complex and expensive masking steps. Moreover, the final RTA step may simply be added to the end of the process flow.

Although the invention has been described in connection with one specific preferred embodiment, it must be understood that the invention as claimed should not be unduly limited to this embodiment. Various other modifications and alterations in the process will be apparent to those skilled in the art without departing from the scope of the present invention.

For example, while the process flow shown in FIGS. 3A–3I depicts the furnace alloy/sintering step as occurring immediately prior to formation of the reflective metal layer, this is not required by the present invention. The furnace anneal could take place at any point subsequent to front-end processing steps giving rise to the bulk of the surface state charges, and prior to formation of the reflective metal layer forming the active pixel electrodes. However, by delaying the furnace anneal until immediately prior to deposition of the reflective metal electrodes as shown in FIGS. 3A–3I, this embodiment ensures that any surface state charges generated by back-end processing prior to the furnace anneal are subjected to the maximum thermal exposure and hence have the best chance of suppression.

Given the variety of possible embodiments, It is intended that the following claims define the scope of the present invention, and that processes within the scope of these claims and their equivalents be covered hereby.

What is claimed is:

1. A process for forming a pixel cell comprising the steps of:

forming an oxide/silicon interface in a semiconductor workpiece, the oxide/silicon interface including surface state charges;

performing a furnace anneal of the semiconductor workpiece for at least 30 minutes at a temperature of between about 400–450° C., the furnace anneal suppressing the surface state charges;

forming an interconnect structure including an intermetal dielectric layer over the semiconductor workpiece;

forming a plurality of discrete reflective metal pixel electrodes over the intermetal dielectric layer after the furnace anneal step; and performing a rapid thermal anneal at a temperature of between about 400–450° C. for not longer than 30 seconds after formation of the discrete reflective metal pixel electrodes, the rapid thermal anneal further suppressing the surface state charges.

2. The process according to claim 1 wherein the step of forming a plurality of discrete reflective metal pixel electrodes occurs immediately following the furnace anneal step.

3. The process according to claim 1 wherein the step of forming a plurality of discrete reflective metal pixel electrodes does not occur immediately following the furnace anneal step.

4. The process according to claim 1 wherein the furnace anneal step and the rapid thermal anneal step are performed in the presence of a forming gas comprising between about 5–10% hydrogen in nitrogen.

5. The process according to claim 1 wherein the step of forming the discrete active metal electrodes comprises:

forming a reflective metal layer by chemical vapor deposition over the intermetal dielectric;

patterning a photoresist mask over the .reflective metal layer to exclude inter-pixel regions; and etching the reflective metal layer in inter-pixel regions to create the plurality of discrete reflective pixel electrodes.

6. The process according to claim 5 wherein the step of forming the metal layer over the intermetal dielectric comprises depositing aluminum by chemical vapor deposition.

7. A method of preventing degraded reflectance of a pixel cell during fabrication, the method comprising the steps of:

forming an oxide/silicon interface having surface state charges;

performing a furnace anneal to suppress the surface state charges;

forming a reflective active electrode surface over the oxide/silicon interface after the furnace anneal; and performing a rapid thermal anneal to further suppress the surface state charges.

8. The method according to claim 7 wherein:

the furnace anneal is performed at a temperature of between about 400–450° C. for at least 30 minutes in the presence of forming gas; and the rapid thermal anneal is performed at a temperature of between about 400–450° C. for 30 seconds or less in the presence of forming gas.

\* \* \* \* \*